United States Patent [19]

Nakamura

[11] Patent Number: 5,044,719
[45] Date of Patent: Sep. 3, 1991

[54] CABLE CONNECTOR

[75] Inventor: Kunio Nakamura, Tokyo, Japan

[73] Assignee: AMP Incorporated, Harrisburg, Pa.

[21] Appl. No.: 565,296

[22] Filed: Aug. 9, 1990

[30] Foreign Application Priority Data

Aug. 11, 1989 [JP] Japan .................................. 1-94619

[51] Int. Cl.$^5$ ................................................. G02B 6/36
[52] U.S. Cl. ..................................... 385/76; 385/136
[58] Field of Search ............... 350/96.20, 96.21, 96.22, 350/96.23

[56] References Cited

U.S. PATENT DOCUMENTS 4,984,868  1/1991  ten Berge ........................ 350/96.21
4,986,625  1/1991  Yamada et al. .................. 350/96.20

FOREIGN PATENT DOCUMENTS 62-17772  6/1982  Japan .

Primary Examiner—John D. Lee
Attorney, Agent, or Firm—Allan B. Osborne; Adrian J. LaRue

[57] ABSTRACT

A cable connector (10,10') for holding a cable (2) against axial movement is disclosed. The connector 10,10') includes a housing (4) and a clamping member (6,7,8,9). The cable (2) passes through the housing (4) in an opening (40) which is intersected normally by slots (41) into which the clamping member (6,7,8,9) is inserted to receive the cable (2) in recesses (62,72,82,92) defined by pairs of legs (61,71,81,91) of the clamping member (6,7,8,9).

8 Claims, 3 Drawing Sheets 5,044,719

CABLE CONNECTOR

FIELD OF THE INVENTION

This device is a connector for an insulation covered cable such as an optical fiber cable and includes clamping means to prevent axial movement of the cable with respect to the connector housing.

BACKGROUND OF THE INVENTION

A cable connector having this type of clamping means is disclosed in U.S. application Ser. No. 07/391,642, filed on Aug. 7, 1989 (now U.S. Pat. No. 4,986,625). The clamping member to retain a cable in a connector housing comprises not only leg portions to hold such cable by engaging (or biting) the surface thereof but also an anti-slipping mechanism to engage the clamping member itself with the connector housing so that the clamping member does not slip out of the connector housing.

Projections and latching nails are required for engaging such clamping member and housing, thereby making the structure complicated and expensive.

It is therefore an object of this device to provide a cable connector provided with means for effectively securing the clamping member and housing without using such special anti-slipping mechanism.

SUMMARY OF THE INVENTION

The cable connector according to the present device includes a connector housing to pass a cable therein and a clamping member to hold such cable within the housing by engaging with the outer surface of the cable. The cable connector is characterized in that said housing has through-holes in front and back planes to pass the cable and also slots in a side plane through which clamping legs of the clamping member are inserted. The thickness of the legs extending into the housing from the slots of the clamping member is relatively larger than the width of the slots at least one part thereof.

DESCRIPTION OF THE INVENTION

Figure 1:
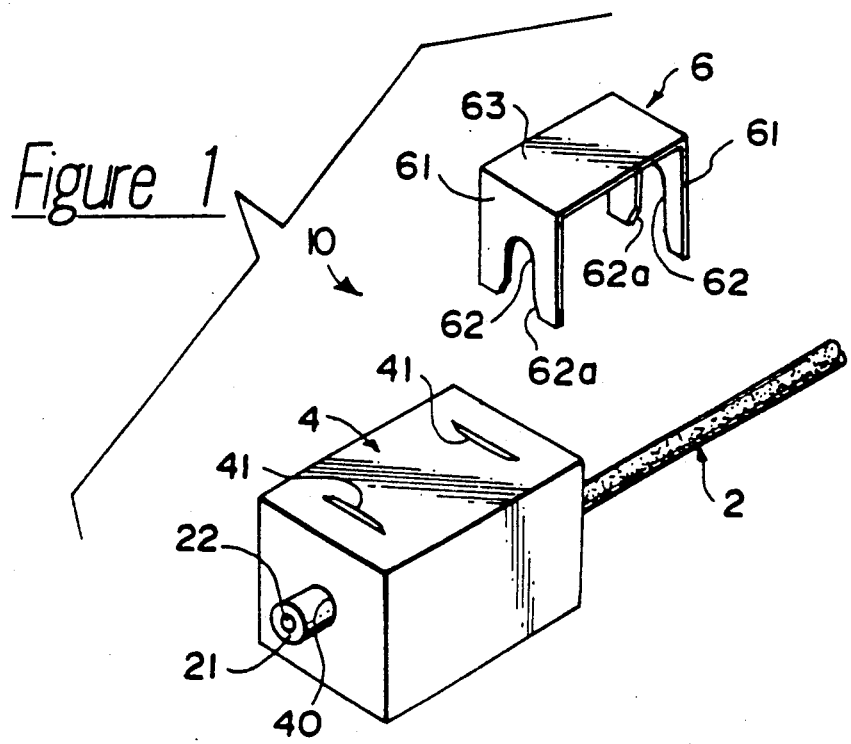
FIG. 1 is a perspective view of one embodiment of the cable connector according to the present device.
Figure 2:
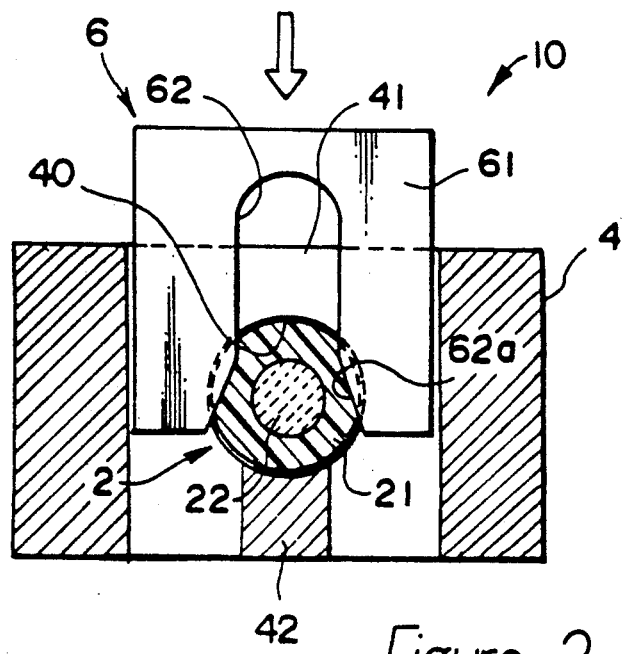
FIG. 2 is a cross section view to illustrate the way of assembling the cable connector in FIG. 1.

Illustrated in FIGS. 1 and 2 is one embodiment of cable connector 10 applied to a plastic optical fiber cable. The optical fiber cable 2 is a conventional dual structure comprising a core section 22 and a clad or an outer jacket 21 such as a nylon coat, etc. Such cable 2 passes through the connector housing 4 at through-holes 40 in front and back plates. The cable connector 10 comprises the connector housing 4 to pass the cable 2 therethrough and a clamping member 6 to engage with the outer surface or outer jacket 21 of the cable 2 inside of the housing 4 for holding the cable 2 with respect to the housing 4. The housing 4 has slots 41,41 perpendicular to the through-holes 40 for inserting leg portions 61 of the clamping member 6 from the outside of the housing 4.

In the embodiment as illustrated in FIGS. 1 and 2, the clamping member 6 comprises a pair of leg portions 61 coupled together by an interconnection portion 63. The leg portions 61 have recesses 62 to receive cable 2 therein. The recesses 62,62 are provided with tapered section 62a,62a for ease of insertion of and biting into the outer jacket 21 of the cable 2 when inserted into the housing 4 through the slots 41,41.

As illustrated in FIG. 2 in a magnified scale, insertion of the leg portions 61 of the clamping member 6 inside of the housing 4 through the slots 41 will cause the tapered sections 62a of the recesses 62 in the leg portions 61 to bite into the outer jacket 21 of the cable 2. Subsequently, the inner edges of the recesses 62 following the tapered sections 62a also bite into the outer jacket 21 to secure the cable 2 in its axial direction. When inserted into the slots 41 in the housing 4, the clamping member 6 is aligned with the housing 4 and the cable 2 is secured within the housing 4 in the axial direction of the cable 2. Proper choice of the width of the clamping member 6 substantially equal to the length of the slot 41 will make the cable immovable in perpendicular direction to the axis. The inner surfaces of the housing 4 are close to the outer edges of the leg portions 61 of each clamping member 6 to act as guide members to protect the leg portions 61 from expanding outwardly when the clamping member 6 is inserted in the slots to have the leg portions 61 bite into the outer jacket 21 of the cable 2. Also, there is provided a support portion 42 in alignment with the slots 41 and just below the through-holes 40 so as to support the cable 2 when the clamping member 6 is being inserted. Slots 41 have space to leave some material below the through-holes 40 as shown in FIG. 2.

Figure 3:
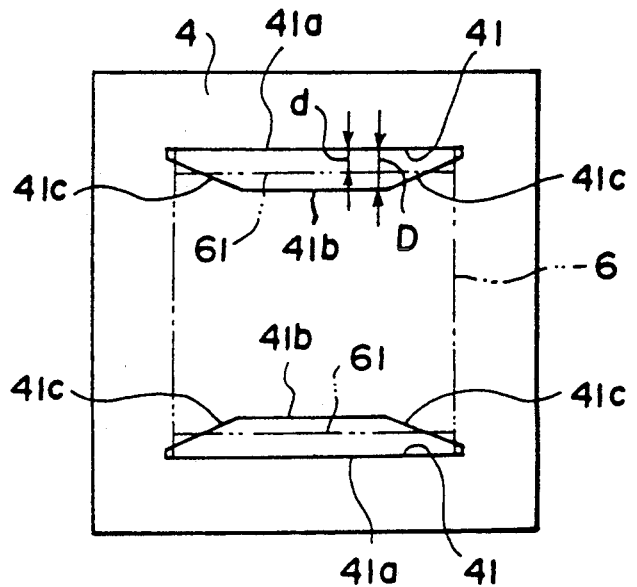
FIG. 3 is a plan view of the cable connector of FIG. 1 (excluding the cable)

In the present device, anti-slipping means is provided so that the clamping means 6 does not easily slip out of the housing under this condition. To this end, the leg portions 61 of the clamping members 6 are designed to have the thickness d which is at least partly larger than the width D of the slots 41; e.g. in FIG. 3, d>D near both ends of the slots 41. That is, the thickness d of the leg portions 61 of the clamping member 6 is constant over the entire length of the slots 41 while the width D of the slots 41 is larger than the thickness d of the leg portions 61 at the center section but tapered smaller than the thickness d toward both ends. Since d>D at and near the both ends, the clamping member 6 is firmly held in the slots 41 of the housing 4 by an interference fitting of leg portions 61 after being pressed in.

Figure 4:
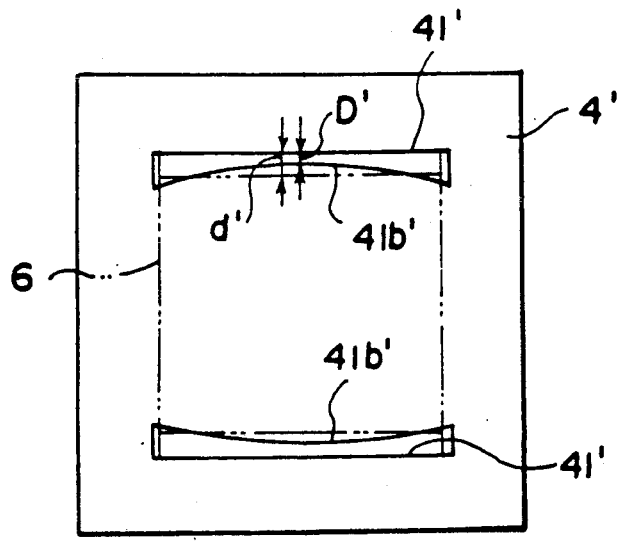
FIG. 4 is a plan view of another embodiment.

It is to be understood that the relationship between the thickness d of the leg portions 61 and the width D of the slots 41 may be reversed, i.e., the slots 41 are narrower (D is smaller in this instance) at the center section of the slots 41, thereby making d>D at least one part along the entire length of the slots 41. Illustrated in FIG. 4 is an embodiment depicting this design. Here, the thickness d' of the leg portions 61 is constant but the slots 41' in the housing 4' have curved surfaces 41b' to reduce the width $D_1$ at the center portion.

The slots 41 may be made narrower than the thickness of the leg portions 61 over the entire length. However, this may result in difficulties in inserting the clamping member 6 due to tolerance of the material, thereby reducing working efficiency. It is, therefore, desirable that the slots be partly d>D.

Figure 5:
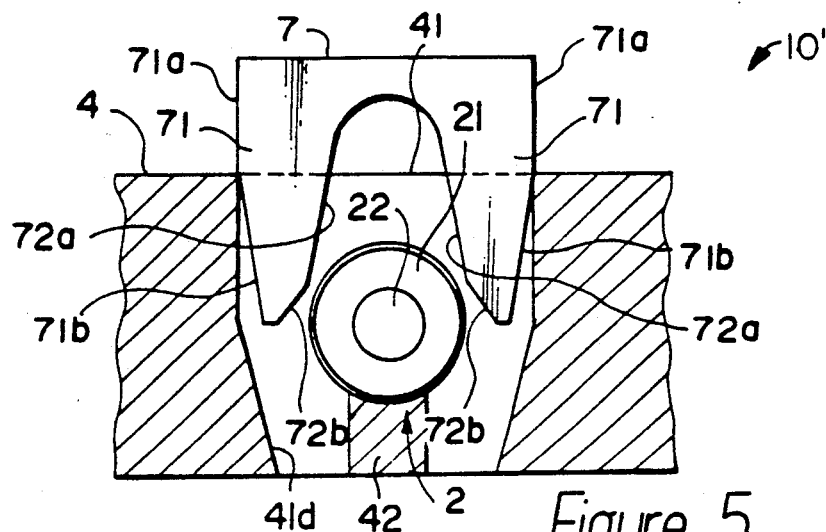
FIGS. 5 and 6 are cross section views of still another embodiment.

The shape of the clamping member 6 may not necessarily be the same as the one illustrated in FIGS. 1 and 2. That is, the recesses 62 of the leg portions 61 may not be narrower than the diameter of the outer jacket 21 of the cable 2, wider than the diameter of the core portion 22 and parallel in the both edges. For example, connector 10' as illustrated in FIG. 5 provides recesses of the leg portions 71 of clamping member 7 to have relatively smaller tapered sections 72a at the upper portion and then relatively abrupt or larger tapered sections 72b at the lower portion. The outer edges of the leg portions 71 have upper sections 71a parallel to each other and lower sections 71b tapered inwardly. When the clamping member 7 is pushed into the slots 41 in the housing 4, the lower portions 71b of the leg portions 71 abut against and are guided by tapered inner walls 41d of the housing 4 to make the entrance of the recesses narrower and to have the tapered sections 72a bite into the outer jacket 21 (see FIG. 6).

Figure 6:
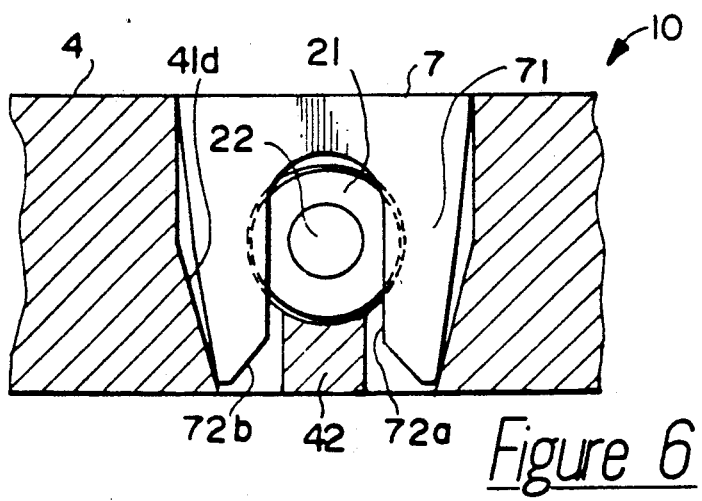

The clamping member 7 as illustrated in FIGS. 5 and 6 may be replaced for the clamping member 6 as illustrated in FIGS. 1 and 2.

Figure 7:
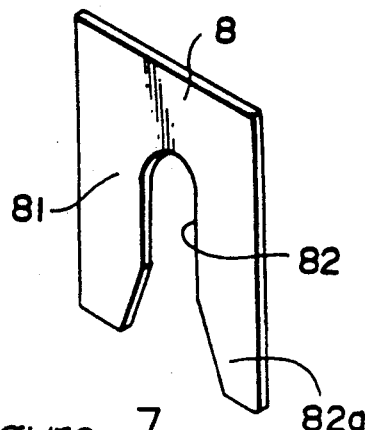
FIGS. 7 and 8 are perspective views of the clamping members of different embodiments using a single plate design.
Figure 8:
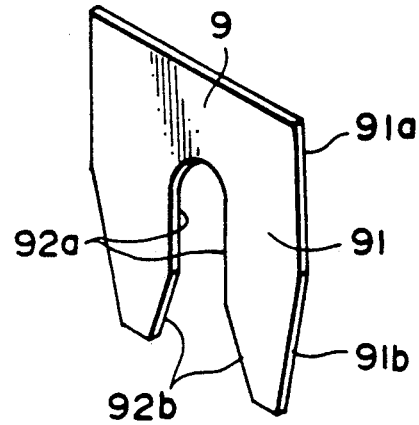

Illustrated in FIGS. 7 and 8 are examples of clamping members 8 and 9 excluding the interconnection portion 63. The former clampinq member 8 features leg portions 81 with lower tapered sections 82a on both sides of the recess 82. On the other hand, clamping member 9 features leg portions 91 with parallel inner sections 92a at the upper portion, tapered inner sections 92b at the lower portion, parallel outer sections 91a at the upper portion and inwardly tapered outer sections 91b at the lower portion.

Only a single plate clamping member 8,9 as illustrated in FIGS. 7 and 8 will provide sufficient cable retaining force by simply choosing the thickness larger than the width of the slot in the housing at least one part of the clamping member 8,9. These embodiments are more advantageous because of simpler construction, improved workability and reduced production cost.

In the cable connector according to the present invention, the clamping member is held in the housing by interference fitting due to resiliency of the housing and/or clamping member when the legs of the clamping member are pressed into the slots in the housing because the thickness of the legs of the clamping member is relatively larger than the width of the slots at least one part thereof.

Accordingly, the clamping member is effectively prevented from slipping out of the housing without the need of providing additional anti-slipping mechanisms. This helps to simplify the construction and to reduce cost.

I claim:

1. A cable connector for holding a cable against axial movement, said connector comprising:
    a housing having a cable-receiving opening extending therethrough and a first slot located intermediate ends of said housing and normally intersecting said opening, said first slot including a first portion having a narrower width than the rest of said first slot; and
    a flat U-shaped clamping member having a single first pair of legs joined by a bight at one end for being inserted into said opening through said first slot and for receiving the cable when disposed in the opening between said first pair of legs, said clamping member having a thickness greater than the width of said first portion of said first slot so that said clamping member is fictionally retained in said housing.

2. The connector of claim 1 wherein said first portion of said first slot is at and adjacent both ends thereof.

3. The connector of claim 1 wherein said first portion of said first slot is intermediate both ends thereof.

4. The connector of claim 1 further including a second slot spaced from and parallel to said first slot and having a narrow first portion and said clamping member includes a second pair of legs joined by a bight at one end, said second pair being joined to said first pair by an interconnection portion and adapted for insertion into said second slot.

5. The connector of claim 1 wherein said first pair of legs are adapted to cut into insulation which surrounds the cable.

6. A cable connector for holding a cable against axial movement, said connector comprising:
    a housing having a cable-receiving opening extending therethrough and a first slot located intermediate ends of said housing and normally intersecting said opening, said first slot including tapered inner walls converging toward each other at a location substantially midway of said cable-receiving opening; and
    a U-shaped clamping member having a pair of legs joined by a bight at one end for insertion into said cable-receiving opening through said first slot, said legs receiving the cable therebetween when disposed in said cable-receiving opening and frictionally engaging with said respective tapered inner walls at the outer edges thereof thereby causing the inner surfaces of the legs to engage the cable.

7. A cable connector as claimed in claim 6, wherein said legs include lower sections having tapered-inwardly outer edges.

8. A cable connector as claimed in claim 6, wherein opposing edges of an upper portion of said legs have a small taper and opposing edges of a lower portion of said legs have a large taper.

* * * * *